US006125992A

United States Patent [19]

Dudley

[11] Patent Number: 6,125,992

[45] Date of Patent: Oct. 3, 2000

[54] CHIP CONVEYOR WITH ACTUATOR ARRANGEMENT

[76] Inventor: Russell D. Dudley, 3916 Old Field Trail, Kalamazoo, Mich. 49008

[21] Appl. No.: 09/033,472

[22] Filed: Mar. 2, 1998

[51] Int. Cl.[7] .................... B65G 25/00

[52] U.S. Cl. .................... 198/741

[58] Field of Search .................... 198/741, 747, 198/740, 739; 741/740

[56] References Cited

U.S. PATENT DOCUMENTS

| | | | |
|---|---|---|---|
| 2,130,082 | 9/1938 | Ferry | 197/741 |
| 3,158,257 | 11/1964 | Peras | 198/741 |
| 3,747,742 | 7/1973 | Wissmann | 198/740 |
| 3,828,920 | 8/1974 | Becker et al. | 198/741 |
| 3,882,997 | 5/1975 | Dudley . | |
| 4,026,408 | 5/1977 | Becker | 198/741 |
| 4,377,259 | 3/1983 | Areaux et al. . | |
| 4,411,256 | 10/1983 | Radas | 198/739 |

FOREIGN PATENT DOCUMENTS

| | | | |
|---|---|---|---|
| 770949 | 10/1980 | U.S.S.R. | 198/741 |

OTHER PUBLICATIONS

Exhibit A discloses a prior art chip conveyor sold by Chip Systems, Inc.

Exhibit B discloses a prior art chip conveyor sold by Prab Conveyors.

Exhibit C discloses prior art cylinders sold by Parker Company.

*Primary Examiner*—Christopher P. Ellis
*Assistant Examiner*—Joe Dillon, Jr.
*Attorney, Agent, or Firm*—Price Heneveld Cooper DeWitt & Litton

[57] ABSTRACT

A chip conveyor has an upwardly open housing defining a U-shaped trough for conveying metal chips from a machining operation. The housing includes a bottom and defines an upper edge. A reciprocatable plow ram is positioned in the housing for motivating the metal chips along the trough. An actuator is located in the housing for reciprocating the ram, the actuator including a cylinder and an extendable rod associated with the cylinder and connected to the ram by an upright bracket that helps position the cylinder and rod above the bottom of the trough. The cylinder is spaced above the bottom and located proximate the upper edge at a location where the cylinder is generally above the metal chips in the trough so that the cylinder does not encounter the metal chips or debris associated therewith, and so that maintenance on the cylinder is made easier. The cylinder and rod are connected to the housing and ram by pull pins for quick release to further facilitate maintenance. A pair of cylinders may be used that define an opening therebetween, and that have extendable rods connected to an intermediate part of the ram, such that an upstream end of the ram is located below and between the cylinders for receiving chips dumped between the cylinders.

23 Claims, 4 Drawing Sheets

100
111
115
116
117
113
114
12

10A
19
11
14
13
14'
29'
29
17
26
16
15
20

14'
14
30
28
17
16
15
21
V
20

VI
19
30
11
12
17
28
14
11'
26

CHIP CONVEYOR WITH ACTUATOR ARRANGEMENT

BACKGROUND OF THE INVENTION

The present invention concerns chip conveyors having a reciprocating plow ram and an actuator positioned proximate an upstream end of the ram.

Historically, ram-type chip conveyors have been designed in an in-line arrangement with a conveyor trough, a reciprocatable ram, and a drive cylinder including a retractable/extendable rod, the centerline of the drive cylinder and rod being approximately in-line with the centerline of the ram at a bottom of the conveyor trough and upstream of the ram. A problem with this design is that the first several feet of the conveyor is not usable since it is taken up by the drive cylinder. Another problem with this design is that cutting fluid, chips and debris collect around and cover the cylinder. This leads to maintenance problems since chips and debris are brought back when the rod is retracted causing excessive wear on the cylinder rod and degradation of the rod-engaging cylinder seal. This is problematic due to the existence of the chips and abrasive debris on the rod as it is retracted, and also due to chips being compressed against the cylinder seals by the upstream end of the ram. The chips and debris also cause hydraulic hose failure and/or reduced service life. Sometimes the conveyor system is allowed to flood with metal-cutting fluid. This makes cylinder maintenance very difficult and time-consuming, because the cutting fluid, chips, and debris must be removed in order to work on the cylinder. Notably, an emergency maintenance problem with a chip conveyor can shut down an entire plant until the problem can be repaired, such that the ability to quickly access and repair the conveyor cylinder is very important. Nonetheless, the above-noted in-line arrangement of ram-type chip conveyors has existed for many years.

Accordingly, an apparatus solving the aforementioned problems is desired.

SUMMARY OF THE INVENTION

In one aspect of the present invention, a chip conveyor includes a housing defining a trough for conveying metal chips from a machining operation, and a reciprocatable ram positioned in the housing for motivating the metal chips along the trough. An actuator is located in the housing for reciprocating the ram, the actuator including a cylinder and extendable rod associated with the cylinder and connected to the ram. The cylinder is spaced above a bottom of the trough and is located proximate to an upper edge of the trough at a location where the cylinder is generally above the metal chips in the trough so that the cylinder does not encounter metal chips or other debris in the trough.

In another aspect of the invention, a chip conveyor includes a housing defining a trough for conveying metal chips from a machining operation, and a ram positioned in the housing for motivating the metal chips along the trough. An actuator is located in the housing for reciprocating the ram, the actuator including a cylinder and an extendable rod associated with the cylinder and connected to the ram. The housing includes a first attachment bracket and a cylinder connected to the first attachment bracket with a first pull pin, and the ram includes an upright attachment bracket with the rod being connected to the second attachment bracket by a second pull pin. By this arrangement, the cylinder and rod can be quickly and easily removed by removing the first and second pull pins.

In another aspect of the present invention, a chip conveyor includes a housing defining a trough for conveying metal chips from a machining operation, and a ram positioned in the housing for motivating the metal chips along the trough. An actuator is located in the housing for reciprocating the ram, the actuator including a pair of cylinders spaced apart and defining an opening therebetween permitting chips to be dumped through the opening onto an upstream end of the ram.

These and other features, advantages and objects of the present invention will be further understood and appreciated by those skilled in the art by reference to the following specification, claims and appended drawings.

DESCRIPTION OF PRIOR ART

Figures 1, 2, 3, 4:
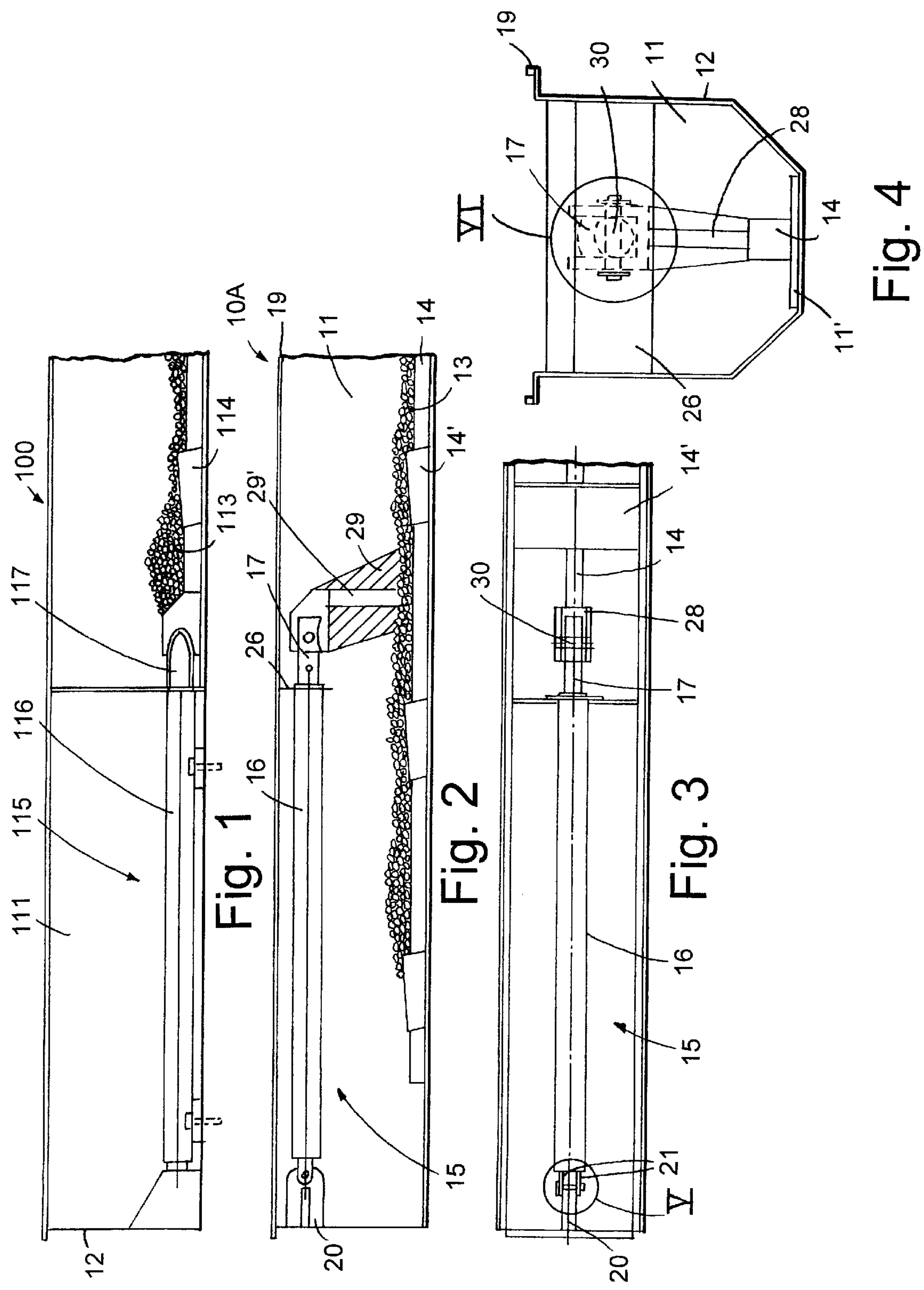
FIG. 1 is a side elevational view of a prior art ram-type chip conveyor.
FIG. 2 is a side elevational view of the first embodiment of a chip conveyor of the present invention.
FIG. 3 is a plan view of the first embodiment of FIG. 2.
FIG. 4 is a cross-sectional end view of the first embodiment of FIG. 2.

A prior art ram-type chip conveyor 100 (FIG. 1) includes an upwardly open housing 111 defining a U-shaped trough 112 for conveying metal chips 113 from a machining operation and includes angled plows 114 shaped to move along the trough 112. A plow ram 114 is positioned in the bottom of the housing 111 for motivating the metal chips 113 along the trough 112, and an actuator 115 is also located in the bottom of the housing 111 for reciprocating the ram 114. The actuator 115 includes a hydraulic drive cylinder 116 anchored to the housing 111 by one or more bolts and an extendable rod 117 connected to the ram 114 by a threaded connector bolt. The cylinder 116 is located at the bottom of the trough 112 in line with the ram 114 so that the forces generated by the cylinder are transmitted linearly into the ram 114. The ram 114 has wedge-shaped plows 118 attached to it for motivating the metal chips 113 along the trough 112 as the ram 114 is reciprocated.

DETAILED DESCRIPTION OF PREFERRED EMBODIMENT

A chip conveyor 10 (FIG. 2) embodying the present invention includes an upwardly open housing 11 defining a U-shaped trough 12 for conveying metal chips 13 from a machining operation. The housing 11 includes a bottom 11' and defines an upper edge 19. A reciprocatable plow ram 14 is positioned in the bottom 11' of the housing 11 for motivating chips along the trough 12. The plow ram 14 includes angled plows 14' shaped to motivate chips along the trough 12. The actuator 15 includes a hydraulic drive cylinder 16 and an extendable rod 17 associated with the cylinder 16. The cylinder 16 is spaced above the bottom 11' of the trough 12 proximate to the upper edge 19 at a location where the cylinder 16 is generally above the metal chips 13 and debris in the trough 12 so that the cylinder 16 does not encounter the metal chips 13, the debris or the cutting fluid associated therewith.

Figure 5:
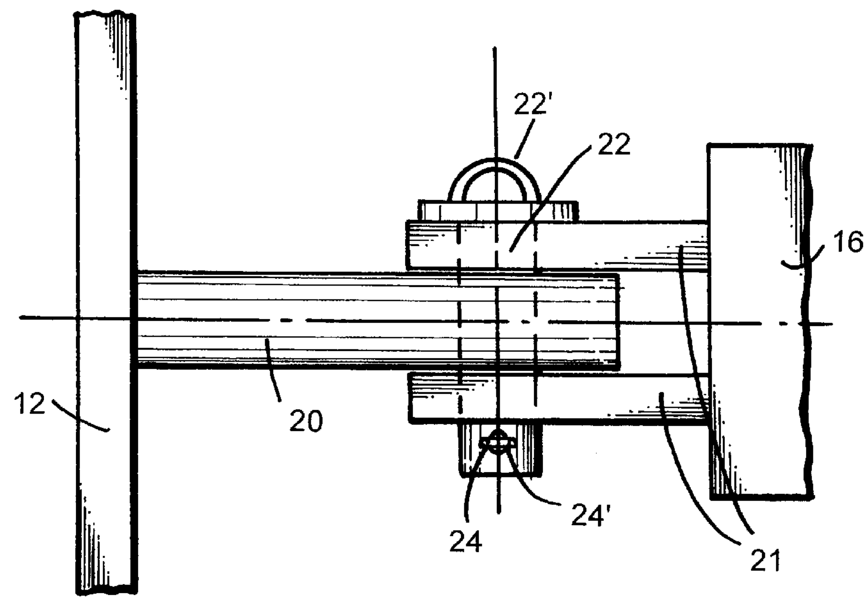
FIG. 5 is an enlargement of circled area V in FIG. 3.

A U-shaped first attachment bracket or anchor 20 (FIG. 2) is attached vertically to the end of the metal trough 12. Two attachment prongs 21 (FIG. 3) extend from the first end of the cylinder 16 and define a space therebetween for receiving the first attachment bracket 20. The first attachment bracket 20 is releasably attached to the first end of the column by a first pull pin 22 that extends through aligned holes in the first attachment bracket 20 and the two attachment prongs 21 (FIG. 5). The pull pin 22 includes a handle or pull ring 22' if desired, to assist in its removal. The first pull pin 22 is held in place using a cotter pin 24 or similar secure but easily removable retainer. The pin 24 may also include a handle or pull ring 24' to assist in its removal.

A support plate 26 (FIG. 4) extends across and is secured to the trough 12. The second end of the cylinder 16 is attached to a "front" end of the cylinder to support the cylinder in its horizontal position when the rod 19 is extended from the cylinder 16. The rod 17 is attached to an upper end of an upright attachment bracket 28 on the ram 14. The attachment bracket 28 is mounted vertically on the ram 14 and rigidly connects the rod 17 to the ram 14. The specific location of the upright attachment bracket 28 can be varied depending on the particular design of the conveyor 10. In the illustrated arrangement, the upright bracket 28 is attached at a location spaced from an upstream end of the ram 14 (See FIG. 2). This allows the upstream end of the ram 14 to motivate chips that fall under the cylinder 16 without interference from the cylinder 16. Such an arrangement is particularly useful where there is minimal room off the upstream end of the trough 12. Advantageously, the upright attachment bracket 28 connection to an intermediate portion of the ram allows active use of the trough space below the actuator 15 to convey metal chips 13. The upright attachment bracket 28 is reinforced with webbing 29' to provide extra strength and rigidity to the bracket 28, preventing the upright attachment bracket 28 from breaking. The upright attachment bracket 28 is rhombus shaped (FIG. 2) and extends forwardly in the downstream direction, creating an optimal transfer of forces from the rod 19 to the ram 14 when the rod 17 is extended. The rigidity and shape of bracket 28 helps to prevent buckling of the ram 14.

As shown in FIG. 4, the upright attachment bracket 28 has a C-shaped, upwardly open top into which the rod 17 is laid. The upright attachment bracket 28 is slightly larger at the top than at the bottom 11' where it attaches to the ram 14 to optimize stress distribution and maximize its life. A second pull pin 30 extends through holes in the upright attachment bracket 28 and through the rod 17. The second pull pin 30 optionally includes a pull-assist ring 30', and is held in place using a second cotter pin 32 or other easily removable fastener arrangement that also optionally includes a pull-assist ring or handle 32'.

The first pull pin 22 (used to attach the cylinder 16 to the first attachment bracket 20) and the second pull pin 30 (used to attach the upright attachment bracket 28 to the rod 17) allow the cylinder 16 and rod 17 to be quickly and easily removed for maintenance or repair. This allows for quick and easy maintenance of damaged or worn components, and prevents lengthy plant shutdowns.

Second and third conveyors 10A and 10B embodying the present invention are shown in FIGS. 7–9 and FIGS. 10–12, respectively. To minimize redundant discussion, identical or similar components to conveyor 10 are described using identical numbers, but with the addition of letters "A" and "B".

In the modified conveyor 10A (FIGS. 7–9) of the present invention, the first attachment bracket 20A is attached horizontally across the upper portion of the housing 11A. The two attachment prongs 21A attached to the cylinder 16A are spaced to matingly receive the first attachment bracket 20A. The first attachment bracket 20A and the two attachment prongs 21A are connected using a first pull pin 22A. The first pull pin 22A is placed vertically through the two attachment prongs 21A and the first attachment bracket 20A, and is held in place with a first cotter pin 24A, or other easily removable positive arrangement. The upright attachment bracket 28A is mounted vertically on ram 14A and connects the rod 17A to an end portion of the ram 14A. The upright attachment bracket 28A has an isosceles triangle shape (FIG. 7) with its angled side facing away from the cylinder 16A (i.e., facing downstream along the housing 11A). Advantageously, this allows the upright attachment bracket 28A to move through the metal chips 13 while also motivating the chips forwardly, much like the action of the plows 14'A on the ram 14A.

The second end of the cylinder 16A is supported on a transverse wall 34A that fits mateably into and closes off an upstream section of the trough 12A. The transverse wall 34A prevents metal chips 13 and debris from moving past the U-shaped metal wall 34A and underneath the cylinder 16A. Furthermore, the space upstream of the wall 34A can serve as a collection sump for cutting fluid if desired. A downwardly facing U-shaped retainer plate 36A is placed downwardly over the cylinder 16A and is attached to the U-shaped metal wall 34A. This provides excellent support for the cylinder 16A when the rod 17A is extended and prevents any vertical movement of the second end of the cylinder 16A during operation. It is contemplated that the retainer plate 36A can be designed so that the cylinder 16A can be slid longitudinally out of engagement with the wall 34A and retainer plate 36A without removing the retainer plate 36A. The upright attachment bracket 28A is attached to the rod 17A as described above (see FIG. 6).

In yet another embodiment of the present invention, a conveyor 20B (FIGS. 10–12) includes a pair of cylinders 16B. Each cylinder 16B is spaced apart and on opposite sides of the upper edge 11B of the housing 11B. This allows metal chips 13 to be dumped through the opening between the cylinders 16B and onto the ram 14B. The cylinders 16B are each attached to the first attachment bracket 20B with first pull pins 22B (FIG. 6).

Figure 10:
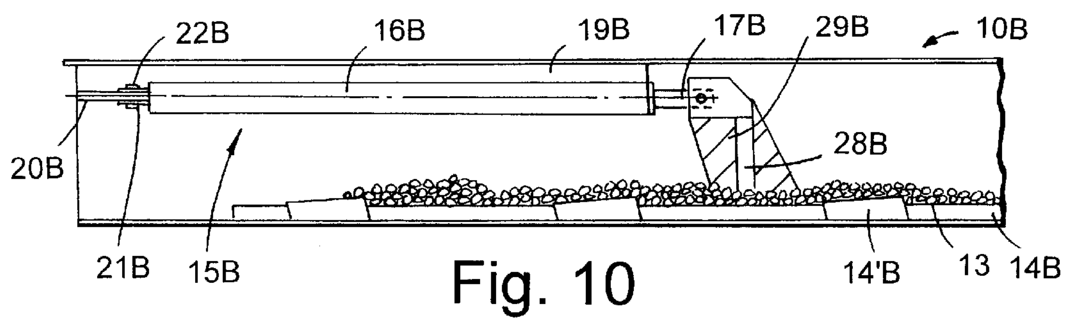
FIG. 10 is a side elevational view of the third embodiment of the present invention.
Figure 11:
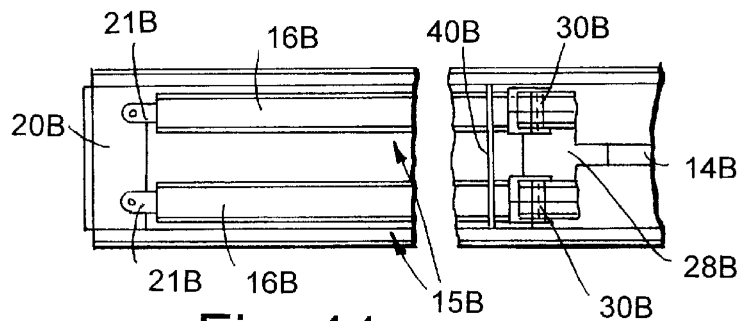
FIG. 11 is a plan view of the FIG. 10.
Figure 12:
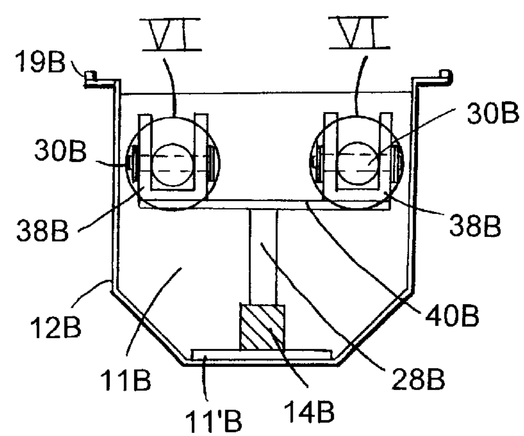
FIG. 12 is a cross-sectional view of FIG. 10.

As shown in FIG. 10, the first attachment bracket 20B is mounted parallel to the bottom 11'B of the trough across the trough 12B and proximate the upper edge 19B of the trough 12B. Attached to the first end of both cylinders 16B are two attachment prongs 21B which fit over the first attachment bracket 20B. The second ends of both cylinders 16B are supported by a rectangular metal support plate 26B mounted across the trough 12B to prevent the cylinder 16B from falling when the rod 17B is extended. It is contemplated that a hydraulic control device will be operably attached to the cylinders 16B to assure that they extend simultaneously in a non-binding manner.

Figure 6:
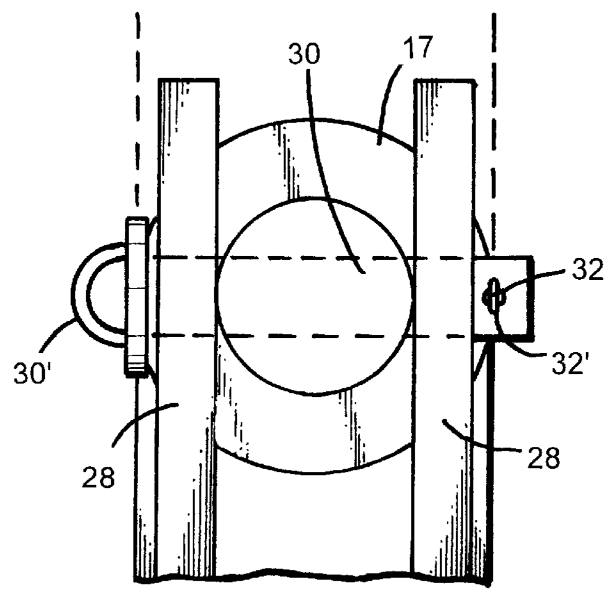
FIG. 6 is an enlargement of the circled area VI in FIG. 4.
Figure 7:
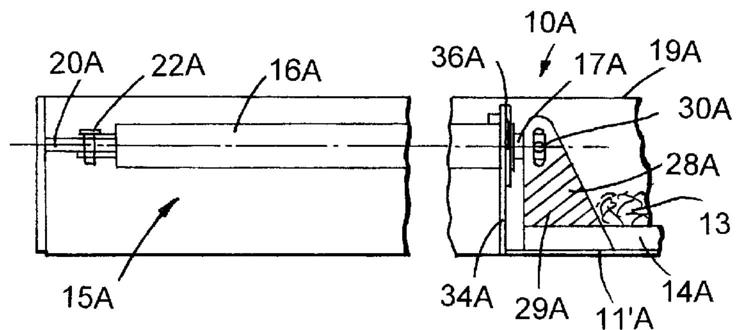
FIG. 7 is a side elevational view of the second embodiment of the present invention.
Figure 8:
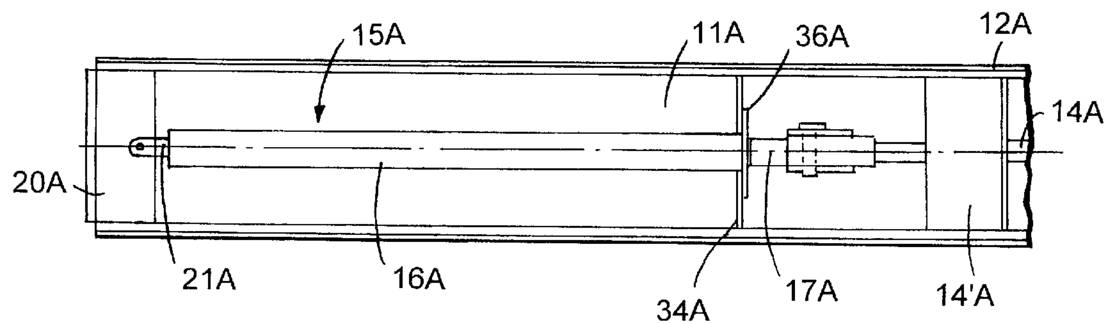
FIG. 8 is a plan view of FIG. 7.
Figure 9:
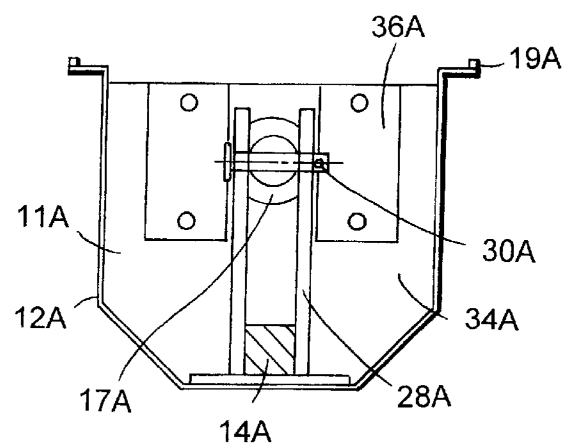
FIG. 9 is a cross-sectional end view of FIG. 7.

The rods 17B (FIG. 12) of the first and second cylinders 16B are attached to upwardly facing C-shaped portions of the upright attachment bracket 28B with two second pull pins 30B (FIG. 6). The upwardly open C-sections 38B are attached to a metal plate 40B extending between the two upwardly shaped C-sections 38B of the upright attachment bracket 28B for support. The upright attachment bracket 28B is dimensioned extends from the center of the metal plate 40B downwardly, where it is connected to the ram 14B. The upright attachment bracket 28B is rhombus shaped (FIG. 10) to optimize transfer of forces from the actuator 15B to the ram 14B. The upright attachment bracket 28B is dimensioned to provide optimal stability for the metal plate 40B, rods 17B, and ram 14B. This also minimizes interference of the upright attachment bracket 28B with chip conveyance.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A chip conveyor comprising:

a housing defining a trough constructed to convey metal chips and debris away from a machining operation, the housing including a bottom and defining an upper edge;

a reciprocatable ram positioned in the housing for motivating the metal chips and debris along the trough; and an actuator for reciprocating the ram, the actuator including a cylinder having an anchored first end and also having a second end, and an extendable rod operably associated with the cylinder and connected to the ram;

the cylinder being spaced above the bottom and located proximate and substantially parallel to the upper edge at a location where the cylinder is generally above the metal chips and debris in the trough so that the cylinder does not encounter the debris or debris associated with the bottom of the trough.

2. A chip conveyor comprising:

a housing defining a trough constructed to convey metal chips away from a machining operation, the housing including a bottom and defining an upper edge;

a reciprocatable ram positioned in the housing for motivating the metal chips along the trough; and an actuator for reciprocating the ram, the actuator including a cylinder having an anchored first end and also having a second end, and an extendable rod operably associated with the cylinder and connected to the ram;

the cylinder being spaced above the bottom and located proximate the upper edge at a location where the cylinder is generally above the metal chips in the trough so that the cylinder does not encounter the metal chips or debris associated with the bottom of the trough;

an upright first attachment bracket releasably connecting one end of the rod to the ram and a second attachment bracket anchoring the first end of the cylinder to the housing, one of the first bracket and the second bracket containing reinforcing webbing to strengthen the one attachment bracket.

3. A chip conveyor comprising:

a housing defining a trough constructed to convey metal chips away from a machining operation, the housing including a bottom and defining an upper edge;

a reciprocatable ram positioned in the housing for motivating the metal chips along the trough; and an actuator for reciprocating the ram, the actuator including a cylinder having a first end and also having a second end, and an extendable rod operably associated with the cylinder and connected to the ram;

the cylinder being spaced above the bottom and located proximate and substantially paralleled to the upper edge at a location where the cylinder is generally above the metal chips in the trough so that the cylinder does not encounter the metal chips or debris associated with the bottom of the trough; and a U-shaped attachment bracket shaped to detachably connect the extendable rod to the ram, and including a pull pin engaging the U-shaped attachment bracket for releasably connecting the end of the extendable rod to the ram.

4. A chip conveyor comprising:

a housing defining a trough constructed to convey chips and debris from a machining operation, the housing including a bottom half and defining an upper edge;

a reciprocatable ram positioned in the housing for motivating the chips and debris along the trough; and an actuator for reciprocating the ram, the actuator including a cylinder having an anchored first end and also having a second end, and an extendable rod operably associated with and extendable from the second end, the extendable rod being connected to the ram;

the second end of the cylinder and the ram being spaced above the half at a raised location where the second end of the cylinder is continuously above the chips and debris in the trough so that the second end of the cylinder and the ram do not encounter the chips and debris associated with the bottom half of the trough.

5. The chip conveyor defined in claim 4, including a first attachment bracket releasably connecting one end of the rod to the ram and a second attachment bracket releasably anchoring the first end of the cylinder to the housing, and wherein at least one of the first and second attachment brackets contains reinforcing webbing to strengthen the one attachment bracket.

6. A chip conveyor comprising:

a housing defining a trough constructed to convey metal chips away from a machining operation, the housing including a bottom and defining an upper edge;

a reciprocatable ram positioned in the housing for motivating the metal chips along the trough; and an actuator for reciprocating the ram, the actuator including a cylinder having an anchored first end and also having a second end, and an extendable rod operably associated with the cylinder and connected to the ram;

the cylinder being spaced above the bottom and located proximate the upper edge at a location where the cylinder is generally above the metal chips in the trough so that the cylinder does not encounter the metal chips or debris associated with the bottom of the trough;

an upright first attachment bracket releasably connecting one end of the rod to the ram and a second attachment bracket releasably anchoring the first end of the cylinder to the housing, the second bracket containing reinforcing webbing to strengthen the second attachment bracket.

7. The chip conveyor of claim 1 where the upright first attachment bracket includes a downstream side that is angled forwardly and downwardly in a downstream direction.

8. The chip conveyor defined in claim 6, where the cylinder is located substantially above the bottom of the trough but below the upper edge of the trough.

9. The chip conveyor defined in claim 6, wherein the housing defines an upwardly open U shape.

10. The chip conveyor defined in claim 6, wherein an end of the rod is connected to the ram at a location spaced from an upstream end of the ram so that portions of the ram adjacent the cylinder are usable for motivating chips.

11. The chip conveyor defined in claim 6 including a second actuator positioned adjacent the first-mentioned actuator, the second actuator including a second cylinder having an anchored end and an extendable rod.

12. The chip conveyor defined in claim 6 including a support part that supports the second end of the cylinder, and that divides the trough into an upstream end section where the actuator is positioned, and a separate downstream chip-conveying section where the ram is positioned.

13. The chip conveyor defined in claim 12, wherein the upstream end section is liquid-tight and is configured to receive and contain coolant from the metal chips in the downstream chip-conveying section.

14. The chip conveyor of claim 1 wherein the first attachment bracket removably mounts the first end of the cylinder to the trough.

15. The chip conveyor of claim 14 wherein the upright attachment bracket releasably connects one end of the rod to the ram.

16. The chip conveyor of claim 14 including a pull pin connecting the first end of the cylinder to the first attachment bracket.

17. The chip conveyor defined in claim 16, including a second pull pin connecting the second end of the cylinder to the second attachment bracket.

18. The chip conveyor defined in claim 6 wherein the actuator includes a pair of spaced apart and parallel cylinders and extendable rods.

19. The chip conveyor of claim 18 wherein the cylinders are supported by a plate that extends transversely across the trough.

20. The chip conveyor of claim 10 wherein the ram includes at least one upright bracket connecting one end of each of the extendable rods to the ram.

21. The chip conveyor of claim 20 wherein the at least one upright bracket contains reinforced webbing to strengthen the upright bracket.

22. A chip conveyor comprising:

a housing defining a trough constructed to convey metal chips away from a machining operation, the housing including a bottom and defining an upper edge;

a reciprocatable ram positioned in the housing for motivating the metal chips along the trough; and an actuator for reciprocating the ram, the actuator including a cylinder having an anchored first end and also having a second end, and an extendable rod operably associated with the cylinder and connected to the ram;

the cylinder being spaced above the bottom and located proximate the upper edge at a location where the cylinder is generally above the metal chips in the trough so that the cylinder does not encounter the metal chips or debris associated with the bottom of the trough; and a first attachment bracket removably mounting the first end of the cylinder to the trough, and including a pull pin connecting the first end of the cylinder to the first attachment bracket, the first attachment bracket being U-shaped.

23. The chip conveyor of claim 22 where the first attachment bracket is attached to the trough and includes vertically extending flanges for receiving the pull pin.

* * * * *

UNITED STATES PATENT AND TRADEMARK OFFICE

CERTIFICATE OF CORRECTION

PATENT NO. : 6,125,992
DATED : October 3, 2000
INVENTOR(S) : Russell D. Dudley

It is certified that error appears in the above-identified patent and that said Letters Patent is hereby corrected as shown below:

Column 5, claim 1,
Line 35, "debris and debris" should be -- metal chips and debris --.

Column 6, claim 3,
Line 4, "paralleled" should be -- parallel --.

Claim 4,
Line 26, before "half" insert -- bottom --.

Claim 7,
Lines 61, "claim 1" should be -- claim 6 --.

Column 7, claim 14,
Line 20, "claim 1" should be -- claim 6 --.

Column 8, claim 20,
Line 4, "claim 10" should be -- claim 18 --.

Signed and Sealed this

Eleventh Day of September, 2001

*Attest:*

Nicholas P. Godici

NICHOLAS P. GODICI

*Attesting Officer* — *Acting Director of the United States Patent and Trademark Office*